: 3,749,718
4-(DICHLOROMETHYL)CINNOLINE AND
PROCESS
David Edgar Ailman, Pennington, N.J., assignor to
American Cyanamid Company, Stamford, Conn.
No Drawing. Filed May 7, 1971, Ser. No. 141,443
Int. Cl. C07d 51/08
U.S. Cl. 260—250 A  4 Claims

ABSTRACT OF THE DISCLOSURE

A novel herbicidal compound, 4-(dichloromethyl)cinnoline, herbicidal compositions employing 4-(dichloromethyl)cinnoline, herbicidal methods and a novel method for the synthesis of 4-(dichloromethyl)cinnoline from 4-methylcinnoline are disclosed.

---

This invention relates to a novel cinnoline and its use as a herbicide. It further relates to herbicidal compositions and to a method for preparing the cinnoline compound.

It is well known by homeowners that crabgrass is one of the most difficult weeds to eliminate from a lawn. Its branching root system firmly anchors the plant into the soil, depriving desirable lawn grasses of the needed minerals and water and, ultimately, crowding them out.

Accordingly, it is an object of the present invention to provide a novel compound, composition and method for selectively providing pre- and postemergence control of crabgrass in the presence of desirable turf grasses, such as, Kentucky bluegrass, bentgrass and creeping fescues. A further object of the present invention is to provide a novel method for the preparation of said compounds. These and other objects will become apparent from the following description and examples.

It has been found that the compound 4-(dichloromethyl)cinnoline is useful for the selective pre- and postemergence control of crabgrass. This compound is represented by the following formula:

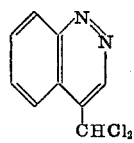

(I)

The herbicidal compositions of the present invention comprise the herbicidally active compound, 4-(dichloromethyl)cinnoline, in combination with solid or liquid adjuvants, formulated as dusts, dust concentrates, wettable powders, pellets, granules and liquids. The herbicidal methods of the present invention comprise application of said compositions to the foliage of the plant to be controlled or to the soil containing the seeds of the plants to be controlled.

Field application of the herbicidal compositions can be made by conventional techniques, such as, with power dusters, boom and hand sprayers, spray dusters, addition to irrigation water and the like.

The active ingredient may initially be formulated as a concentrated composition, comprising the active ingredient in a solid or liquid adjuvant which serves as a formulation aid or conditioning agent, permitting the concentrates to be further mixed with a suitable solid or liquid carrier, in a form which enables prompt assimilation by the plant systems.

Useful liquid adjuvants in which the toxicant is dissolved, suspended or distributed include, for example, the following organic solvents and mixtures thereof: hexane, benzene, toluene, acetone, cyclohexanone, methylethyl ketone, isopropanol, butanediol, methanol, xylene, dioxane, isopropylether, methylene dichloride, tetrachloroethylene, hydrogenated naphthalene, solvent naphtha, and petroleum fractions, such as, kerosene.

Useful solid adjuvants in which the toxicant may be absorbed or dispersed on or include, for example: natural clays, such as, China clays, bentonites, attapulgites; other natural materials, such as, talc, pyrophyllite, quartz, diatomaceous earth, fuller's earth, chalk, rock phosphate, kaolin, kieselguhr, volcanic ash, and sulfur; chemically modified materials, such as acid washed bentonite, precipitated calcium phosphate, precipitated calcium carbonate, calcined magnesia, and colloidal silica; and other materials such as powdered cork, powdered wood and powdered pecan walnut shells. For maximum absorption and ease of handling, these materials are used in finely divided form of particles which range in size from 20 to 40 mesh (Tyler) or finer. Prior to field applications, the solid and liquid concentrate compositions are generally diluted by the addition of a solid or liquid carrier. Suitable solid carriers, in which the concentrate compositions are mixed or absorbed on or in, include: the previously mentioned solid adjuvants; fertilizers, such as ammonium nitrate, urea, superphosphate, composite, manure and humus; pesticides; other herbicides; sand and the like. Suitable liquid carriers in which the concentrate compositions are dissolved, suspended or emulsified or dispersed include, for example, water and the liquid adjuvants previously mentioned.

Dust formulations can be prepared by grinding about 1% to about 15% by weight of the active compound with about 99% to about 85% by weight of a solid inert diluent.

Dust concentrates are made in a similar fashion excepting that the percentage by weight of the active ingredient is increased to about 15% to about 75% by weight of the composition.

Wettable powders are prepared in the same manner as dust concentrates, but usually contain, in addition to the active ingredient and solid diluent, from about 1% to about 5% by weight of a wetting agent, such as sodium isopropyl naphthalene sulfonate or the sodium salt of a sulfonated naphthalene formaldehyde condensate and from about 1% to about 5% by weight of a dispersing agent, such as hydroxyethyl cellulose. Typical formulation would be 50% by weight of the active ingredient, 2% by weight of the dispersing agent, 5% by weight of the wetting agent and 43% of the solid adjuvant, such as attapulgite. In using the wettable powder formulations, it is generally preferred to disperse the solid in water and apply as a liquid spray to the turf or soil to be treated.

In the preparation of granules and pellets, the solid diluent will generally range from about 65% to 99% by weight and the active ingredient will range from about 1% to about 35% by weight. Granules can be prepared by dissolving the toxicant in a solvent and spraying the resulting solution over preformed clay granules, expanded vermiculite or the like while agitating the mixture to distribute the active ingredient over and throughout the granular mass. Such granules can range in particle size from about +60 mesh to about +4 mesh. An active ingredient content of from about 1% to about 6% by weight is generally preferred. It is also possible to make such granules by mixing the finely divided diluent and finely divided herbicide, for instance, by grinding them together, and then forming granules by adding water, tumbling and drying the resulting spheres.

Pellets can be prepared by extruding a mixture that comprises the 4-(dichloromethyl)cinnoline, pelleting clay diluent and water into strands, cutting the strands produced, and drying the product. Pellet size can range from about 10 mesh to larger shapes such as ⅜″ cubes. Pellets preferably contain from about 5% to about 35% by weight of the active ingredient. In addition to the diluents, pelletized and granular compositions can contain additives such as binders, surfactants, and the like.

In general, control of crabgrass is achieved by field applications in which the active ingredient is applied in from about 0.4 to about 25 lbs. per acre. The preferred range is from about 1 to about 10 pounds per acre.

Another aspect of the present invention concerns a method of synthesizing 4-(dichloromethyl)cinnoline from the readily available compound, methylcinnoline.

It has been found that chlorination of methylcinnoline can be selectively carried out to produce a dichloro compound with the exclusion of substantial amounts of the trichloro and monochloro analogs by carrying out the process in the presence of an alkali metal salt of a $C_1$–$C_4$ carboxylic acid dissolved in a $C_1$–$C_4$ carboxylic acid at a temperature of from about 0° C. to about 30° C., and preferably from about 20° C. to about 30° C. The synthesis is schematically represented below:

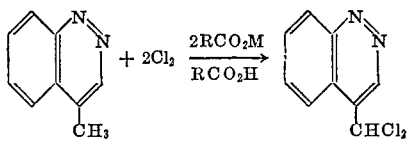

wherein R is a $C_1$–$C_3$ lower alkyl and M is an alkali metal. The relative quantities of ingredients can be widely varied in the practice of the above process; however, it is preferred to employ two moles of the alkali metal salt and the chlorine for each mole of methylcinnoline used.

Suitable carboxylic acids include, for example, formic acid, acetic acid, propionic acid and butyric acid.

Suitable alkali metals include, for example, lithium, sodium and potassium.

The invention is further illustrated by the following examples which are not to be taken as being limitative thereof. In each case, parts and percentages are by weight unless otherwise indicated.

EXAMPLE 1

Preparation of 4-(dichloromethyl)cinnoline

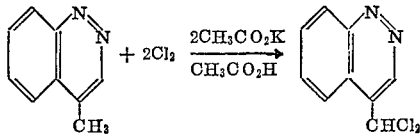

A solution of 4-methylcinnoline (1.0 part), potassium acetate (1.2 part) and acetic acid (7 parts) was placed in a flask which is equipped with reflux condenser and a gas addition tube. The flask was placed on a water bath having a control temperature of 20° C. Chlorine gas (0.98 part) was added to the solution over a period of about 10 minutes. A mildly exothermic reaction took place causing the internal temperature to rise to about 29° C. The resulting mixture was stirred for a period of about 30 minutes, diluted with acetone, filtered from the potassium chloride by-product and treated with water to precipitate 1.14 parts (76% theory) of 4-(dichloromethyl)cinnoline as a green crystalline solid having a melting point in the range of 114° C.–114.5° C. Structural assignment was made on the basis of a nuclear magnetic resonance spectrum and the following elemental analysis:

Calcd. for $C_9H_6Cl_2N_2$ (percent): C, 50.73; H, 2.84; Cl, 33.28; N, 13.15. Found (percent): C, 51.46; H, 2.99; Cl, 32.48; N, 12.73.

The procedure was substantially repeated at 0° C. reaction temperature to produce the desired product free from side products in a 67% yield of theory.

The above procedure was repeated at temperatures ranging from 20° C.–30° C. with mole ratios of chlorine gas to 4-methylcinnoline varying in range from 1:1 to 3:1 with corresponding yields of from 48% to 63% of theory, respectively. In each case, the desired product was isolated substantially free of side products.

EXAMPLE 2

Herbicidal activity of 4-(dichloromethyl)cinnoline

The postemergence herbicidal activity of 4-(dichloromethyl)cinnoline is demonstrated by the following tests wherein the active compound is applied to a variety of grasses. In the tests, seedling plants are grown in jiffy flats for a period of about 2 weeks or to the height indicated. The active compound was dispersed in 50/50 acetone/water mixtures in sufficient quantity to provide the equivalent of about ⅓ to about 1⅓ lbs. per acre of active compound when applied to the plants through a spray nozzle operating at 30 p.s.i. for a predetermined time. After spraying, the plants were placed on greenhouse benches and cared for by conventional greenhouse procedures. Five weeks after treatment, the seedling plants were examined and rated according to the Herbitoxicity Index provided below.

The selective preemergence herbicidal activity of 4-(dichloromethyl)cinnoline is exemplified by the following tests in which the seeds of a variety of monocotyledonous plants were separately mixed with potting soil and planted on top of approximately one inch of potting soil in separate pint cups. After planting, the cups were sprayed with the selected aqueous-acetone solution of the active ingredient in sufficient quantity to provide the equivalent of about 0.33 to 1.33 pounds per acre of the active ingredient per cup. The treated cups were then placed on greenhouse benches and cared for in accordance with conventional greenhouse procedures. Five weeks after treatment, the tests were terminated and each cup was examined and rated according to the Herbitoxicity Index set forth below.

Herbitoxicity Index

| Numerical scale | Herbicidal activity |
|---|---|
| 9 | 100% reduction in stand. |
| 9− | 1–2 stunted plants remaining. |
| 8 | 85–<100% reduction in stand. |
| 7 | 70–<85% reduction in stand. |
| 6 | 60–<70% reduction in stand. |
| 5 | 50–<60% reduction in stand. |
| 4 | 40–<50% reduction in stand. |
| 3 | 30–<40% reduction in stand. |
| 2 | 20–<30% reduction in stand. |
| 1 | 10–<20% reduction in stand. |
| 0 | No apparent effect. |
| s | Severe injury. |
| m | Moderate injury. |
| t | Trace to slight injury. |
| c | Chlorosis. |
| g | Growth retarded. |

The data obtained are reported in Tables I and II below using the above Herbitoxicity Index and table of plant abbreviations set forth below.

Plant abbreviations

| | |
|---|---|
| A | Crabgrass Digitaria spp. |
| B | Bentgrass. |
| C | Kentucky bluegrass. |
| D | Creeping fescues. |
| E | 1½″–3″ crabgrass seedlings. |
| F | 4″–7″ crabgrass seedlings. |
| G | 4″–7″ bentgrass seedlings. |
| H | 4″–7″ Kentucky bluegrass seedlings. |
| I | 4″–7″ creeping fescue seedlings. |

TABLE I.—PREEMERGENCE HERBICIDAL ACTIVITY

| Rate, lb./acre | Plant | | | |
|---|---|---|---|---|
| | A | B | C | D |
| 1⅓ | 9− | 0 | 0 | 0 |
| ⅔ | 5 | 0 | 0 | 0 |
| ⅓ | 0 | 0 | 0 | 0 |

TABLE II.—POSTEMERGENCE HERBICIDAL ACTIVITY

| Rate, lb./acre | Plant | | | | |
|---|---|---|---|---|---|
| | E | F | G | H | I |
| 1⅓ | 9− | 8 | 0 | 0 | 0 |
| ⅔ | 9− | 7 | 0 | 0 | 0 |
| ⅓ | 9− | Mgc | 0 | 0 | 0 |

EXAMPLE 3

Herbicidal activity of 4-(dichloromethyl)cinnoline

The selective, preemergence and postemergence herbicidal activity of 4-(dichloromethyl)cinnoline is further demonstrated by the following tests wherein the active compound was applied to a variety of grasses. The general procedure of Example 2 was followed employing applications of the active ingredeint at the rates indicated in Table III below. Seven weeks after treatment, the seedling plants and seeded cups were examined and rated according to the Herbitoxicity Index provided above. The data obtained are reported in Table III below using the following table of plant abbreviations.

Plant abbreviations

A _____ Crabgrass seedlings 25 days old.
B _____ Crabgrass seedlings 32 days old.
C _____ Crabgrass seedlings 39 days old.
D _____ A reseeded 8 weeks after application.
E _____ Bentgrass.
F _____ Kentucky bluegrass.
G _____ Creeping fescues.

TABLE III

| Activity | Rate, lb./acre | Plant | | | | | | |
|---|---|---|---|---|---|---|---|---|
| | | A | B | C | D | E | F | G |
| Postemergence | 8 | 9 | 9 | Sc | ----- | 0 | 0 | 0 |
| | 4 | 7 | 5 | Sc | ----- | 0 | 0 | 0 |
| | 2 | 7 | 8 | Sc | ----- | 0 | 0 | 0 |
| | 1 | 3 | 7 | Sc | ----- | 0 | 0 | 0 |
| | ½ | Sc | Sc | Sc | ----- | 0 | 0 | 0 |
| Preemergence | 8 | 9 | 9 | 9 | 0 | 0 | 0 | 0 |
| | 4 | 9 | 9 | 9 | 0 | 0 | 0 | 0 |
| | 2 | 9 | 9 | 9 | 0 | 0 | 0 | 0 |
| | 1 | 9 | 8 | 9 | 0 | 0 | 0 | 0 |
| | ½ | 9 | 7 | 7 | 0 | 0 | 0 | 0 |

I claim:

1. The compound 4-(dichloromethyl)cinnoline having the formula:

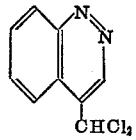

2. A process for the preparation of the compound of claim 1, 4-(dichloromethyl)cinnoline comprising reacting 4-methylcinnoline with chlorine in a solution of an alkali metal salt of a $C_1$–$C_4$ carboxylic acid dissolved in a solvent selected from the class consisting of one or more $C_1$–$C_4$ carboxylic acids, at a temperature of from about 0° C. to about 30° C.

3. A process according to claim 2 wherein the alkali metal salt is potassium acetate and the carboxylic acid solvent is acetic acid.

4. A process according to claim 3 wherein the reaction temperature is from about 20° C. to about 30° C.

References Cited

UNITED STATES PATENTS 3,657,241   4/1972   Kurihara _____ 260—250 A

NICHOLAS S. RIZZO, Primary Examiner

U.S. Cl. X.R.

71—92